US010017163B2

(12) United States Patent
Burguera Albizuri et al.

(10) Patent No.: US 10,017,163 B2
(45) Date of Patent: Jul. 10, 2018

(54) ADJUSTABLE PEDAL FOR MOTOR VEHICLES

(71) Applicant: BATZ, S.COOP., Igorre (ES)

(72) Inventors: Fernando Burguera Albizuri, Bilbao (ES); Ibai Santamaria Teran, Bilbao (ES)

(73) Assignee: BATZ, S. COOP., Igorre (ES)

( * ) Notice: Subject to any disclaimer, the term of this patent is extended or adjusted under 35 U.S.C. 154(b) by 64 days.

(21) Appl. No.: 14/563,915

(22) Filed: Dec. 8, 2014

(65) Prior Publication Data

US 2015/0158468 A1    Jun. 11, 2015

(30) Foreign Application Priority Data

Dec. 9, 2013    (EP) .................................... 13382498

(51) Int. Cl.
| | |
|---|---|
| *G05G 1/40* | (2008.04) |
| *B60T 7/06* | (2006.01) |
| *G05G 1/405* | (2008.04) |

(52) U.S. Cl.
CPC ................ *B60T 7/06* (2013.01); *G05G 1/40* (2013.01); *G05G 1/405* (2013.01); *Y10T 74/20528* (2015.01)

(58) Field of Classification Search
CPC .... Y10T 74/20528–74/2054; Y10T 74/20888; B60T 7/06; G05G 1/30; G05G 1/40; G05G 1/405; G05G 1/44; G05G 1/445
See application file for complete search history.

(56) References Cited

U.S. PATENT DOCUMENTS

| | | | | |
|---|---|---|---|---|
| 4,989,474 | A | * | 2/1991 | Cicotte et al. .................. 74/512 |
| 5,078,024 | A | * | 1/1992 | Cicotte ..................... B60T 7/04 |
| | | | | 74/512 |
| 5,460,061 | A | * | 10/1995 | Redding ................ B60K 26/02 |
| | | | | 74/512 |
| 2003/0126941 | A1 | * | 7/2003 | Sauvonnet et al. ............. 74/512 |
| 2006/0169092 | A1 | * | 8/2006 | Prat Terradas ......... G05G 1/405 |
| | | | | 74/512 |
| 2009/0223319 | A1 | * | 9/2009 | Choi ............................... 74/512 |
| 2015/0107401 | A1 | * | 4/2015 | Farrell .................... B60T 7/042 |
| | | | | 74/512 |

FOREIGN PATENT DOCUMENTS

EP    1365303 A1 * 11/2003 ............... G05G 1/14

* cited by examiner

*Primary Examiner* — Richard W L Ridley
*Assistant Examiner* — Brian J McGovern
(74) *Attorney, Agent, or Firm* — Edell, Shapiro & Finnan, LLC

(57) ABSTRACT

An adjustable pedal that includes a first body with a shoe, a second body pivotable about a shaft, the first body being movably coupled with respect to the second body, a third body being pivotable with respect to the second body and movably coupled with respect to the first body, the third body being coupled to an actuator through a coupling, and a control device suitable for adjusting the position of the pedal. The first body and the second body are telescopically coupled to one another, the control device controlling the distance between the rotating shaft and the coupling by moving the three bodies relatively to one another, keeping the ratio of the distance between the shaft and the shoe and the distance between the shaft and the coupling substantially constant.

23 Claims, 8 Drawing Sheets

ADJUSTABLE PEDAL FOR MOTOR VEHICLES

CROSS-REFERENCE TO RELATED APPLICATIONS

This application relates to and claims the benefit and priority to European patent application no. EP13382498.7, filed Dec. 9, 2013.

TECHNICAL FIELD

The present disclosure relates to an adjustable pedal for motor vehicles, particularly to an adjustable brake pedal or clutch pedal.

BACKGROUND

Adjustable pedals for motor vehicles, particularly brake pedals or clutch pedals, that are adjusted by the driver depending on physical needs are known. In vehicles that integrate fixed pedals, the driver adapts to same by moving the seat until he/she reaches the pedals more or less comfortably. In order to prevent the driver from having sometimes to position him/herself too close to the steering wheel hindering the correct use thereof, adjustable pedals which are capable of adapting the vehicle to the driver and not the other way around are used.

WO2000073099A1 discloses a pedal including a support coupled to the rotating shaft of the pedal and to the rod of the corresponding actuator, a threaded shaft in which the end of the pedal is threaded being housed in the support. The pedal is moved longitudinally by means of rotating the threaded shaft, the shoe thus being adjusted in the desired position. The distance between the rod of the actuator and the rotating shaft is kept constant regardless of the position in which the shoe of the pedal is adjusted.

Pedals keeping the ratio of the distance between the coupling of the rod and the rotating shaft of the pedal and the distance between the shoe to the rotating shaft of the pedal constant are known, such that the relationship between the travel of the rod and of the pedal remains proportional. US2000590581A discloses an adjustable pedal comprising a first arm pivotably coupled to a support, the arm including a shoe at one end, a second arm pivotably coupled to the support, and a lever with one end fixed to the first arm and the other end movably fixed to the second arm, and adjustment means fixed to the lever and to the second arm and connected for changing the position of the second end of the lever in said second arm.

Finally, EP1365303A1 discloses a pedal comprising an arm with a shoe, pivotably assembled about a rotating shaft and acting on a rod of an actuator, a support part pivotably attached to the rotating shaft and movably coupled to the arm, a connecting rod pivotably coupled to the support part and movably coupled to the arm, and a control mechanism suitable for adjusting the position of the pedal. The connecting rod comprises a second shaft and is suitable for being coupled to the rod by means of a movable coupling, the control mechanism controlling the distance between the first rotating shaft and the second rotating shaft.

SUMMARY OF THE DISCLOSURE

According to some implementations an adjustable pedal is provided that comprises a first body including at one end a shoe, a second body pivotable with respect to a rotating shaft, the first body being coupled to the second body, being movable with respect to said second body, a third body pivotably arranged with respect to the second body and movably coupled with respect to the first body, the third body being coupled to an actuator through a coupling, and a control device suitable for adjusting the position of the pedal, the control device being coupled to the first body.

The control device controls the distance between the rotating shaft and the coupling, keeping the ratio of the distance between the rotating shaft and the shoe and the distance between the rotating shaft and the drive coupling substantially constant. To that end, the first body and the second body are arranged with respect to one another in a telescopic manner.

The fact that the first body and the second body are telescopically coupled to one another allows a symmetrical and homogeneous force transmission, so both components suffer less stress in regular use. A lightweight, rigid and optimized pedal is thus obtained. Furthermore, the control device is protected from dirt, etc., since it is housed inside the first body and the second body, a compact pedal being obtained.

These and other advantages and features will become evident in view of the drawings and the detailed description of the invention.

DETAILED DESCRIPTION

Figure 1:
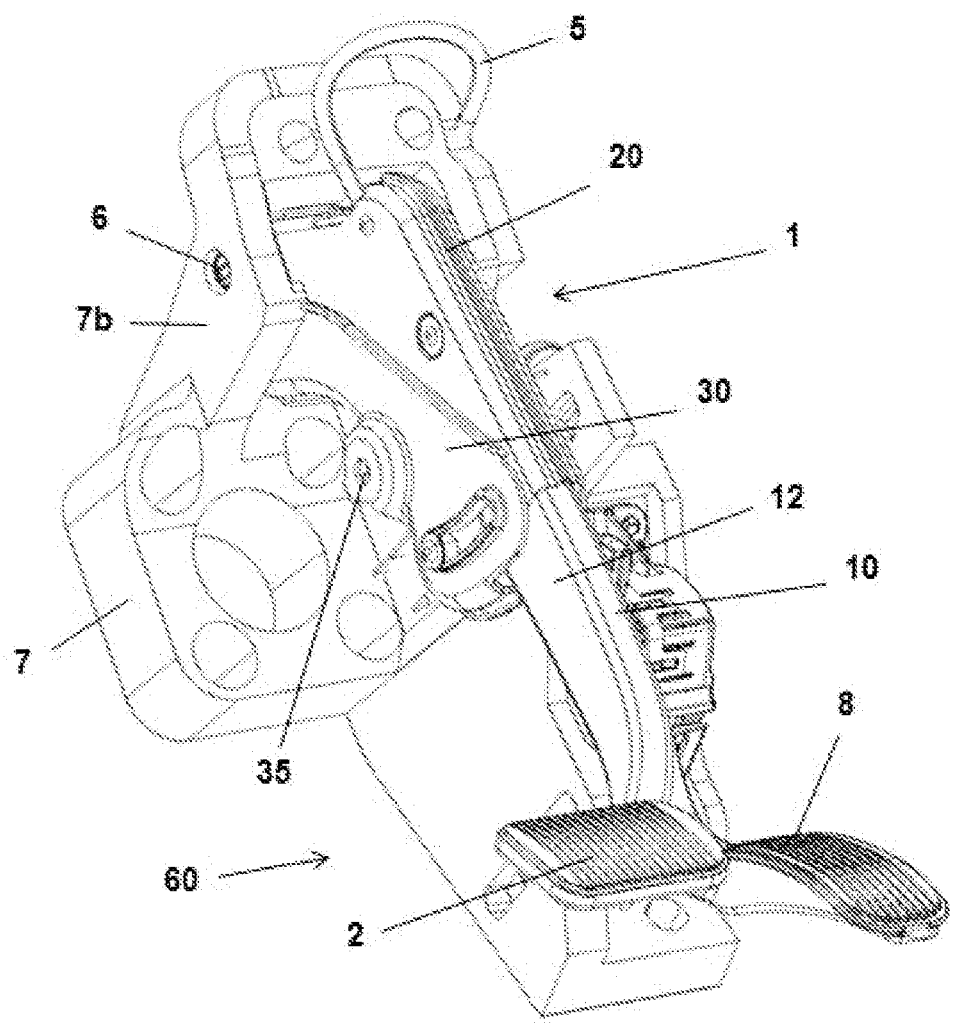
FIG. 1 shows a perspective view of a pedal assembly comprising an adjustable brake pedal according to one implementation.
Figure 2:
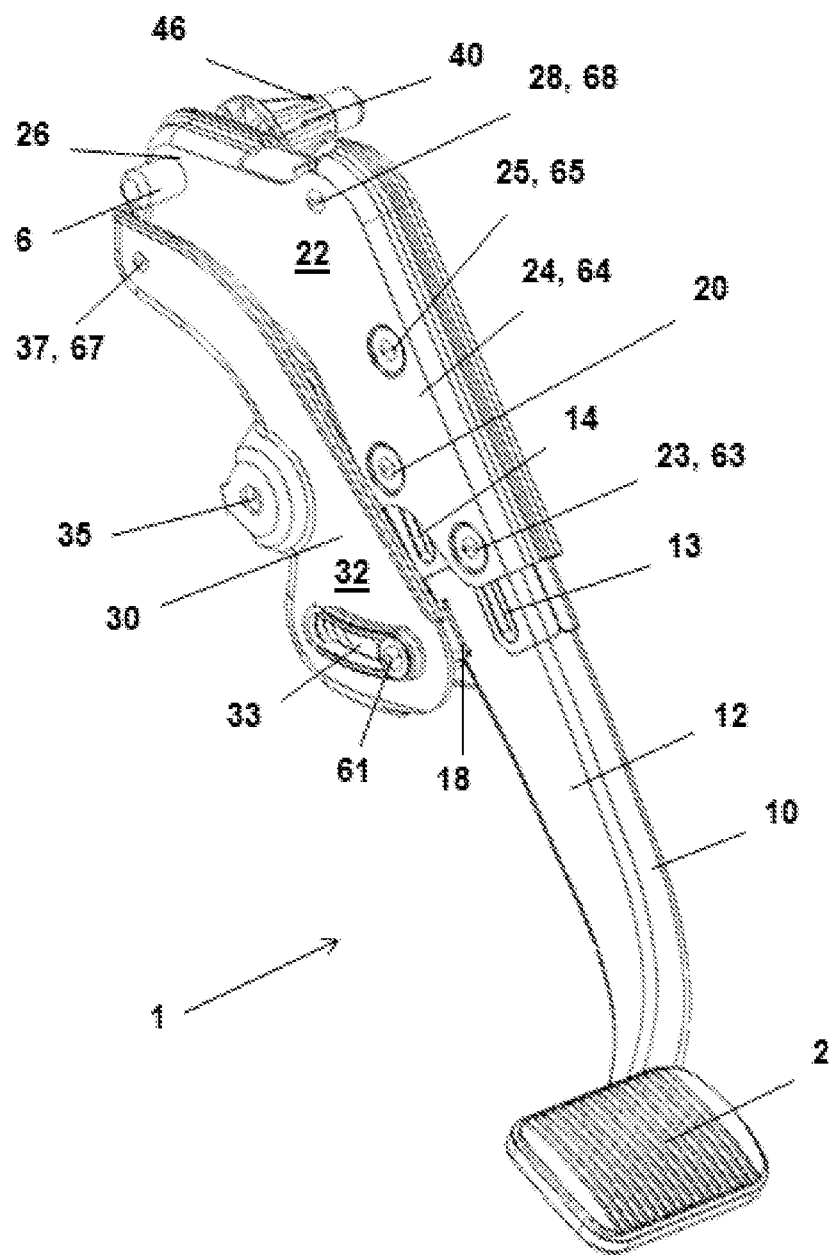
FIG. 2 shows a perspective view of the adjustable brake pedal shown in FIG. 1.
Figure 3:
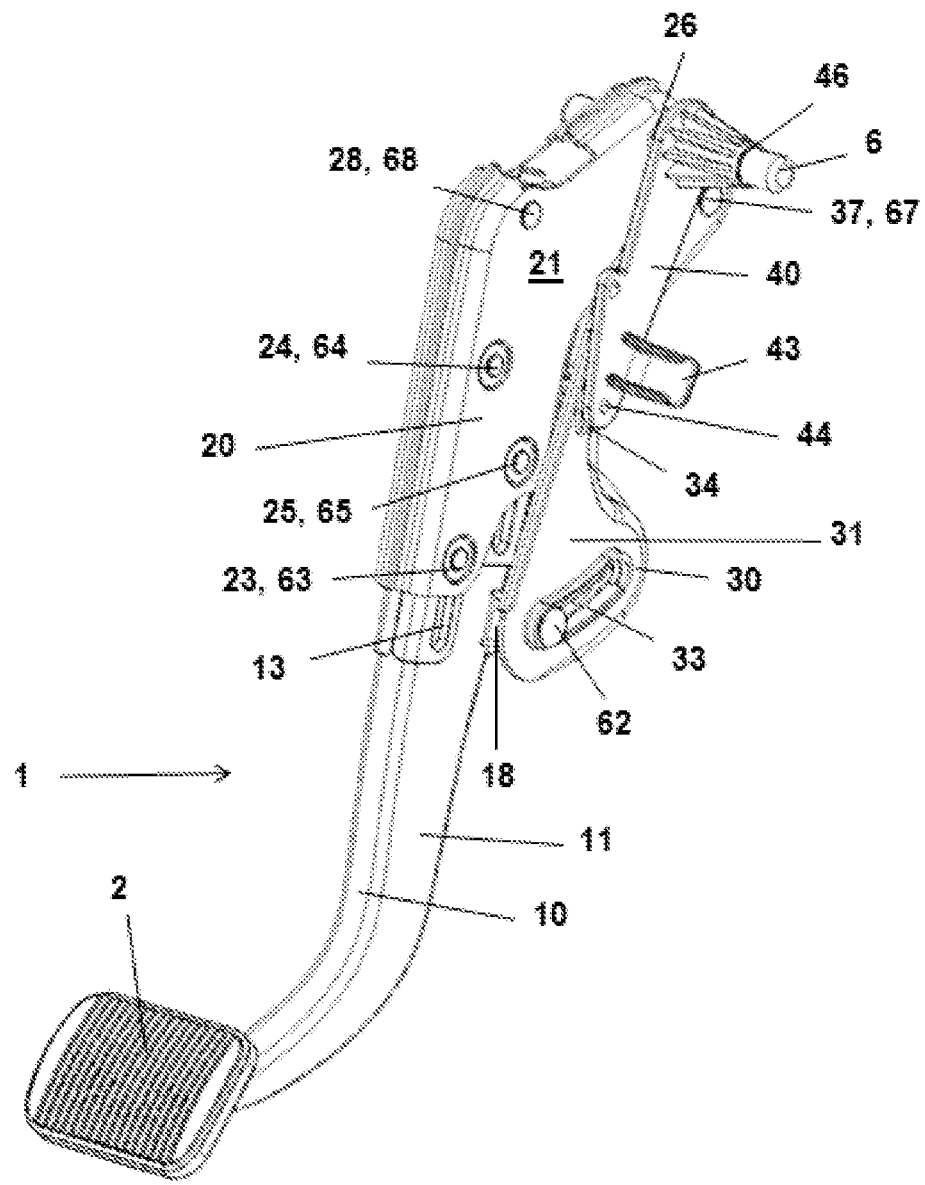
FIG. 3 shows another perspective view of the adjustable brake pedal shown in FIG. 1.
Figure 4:
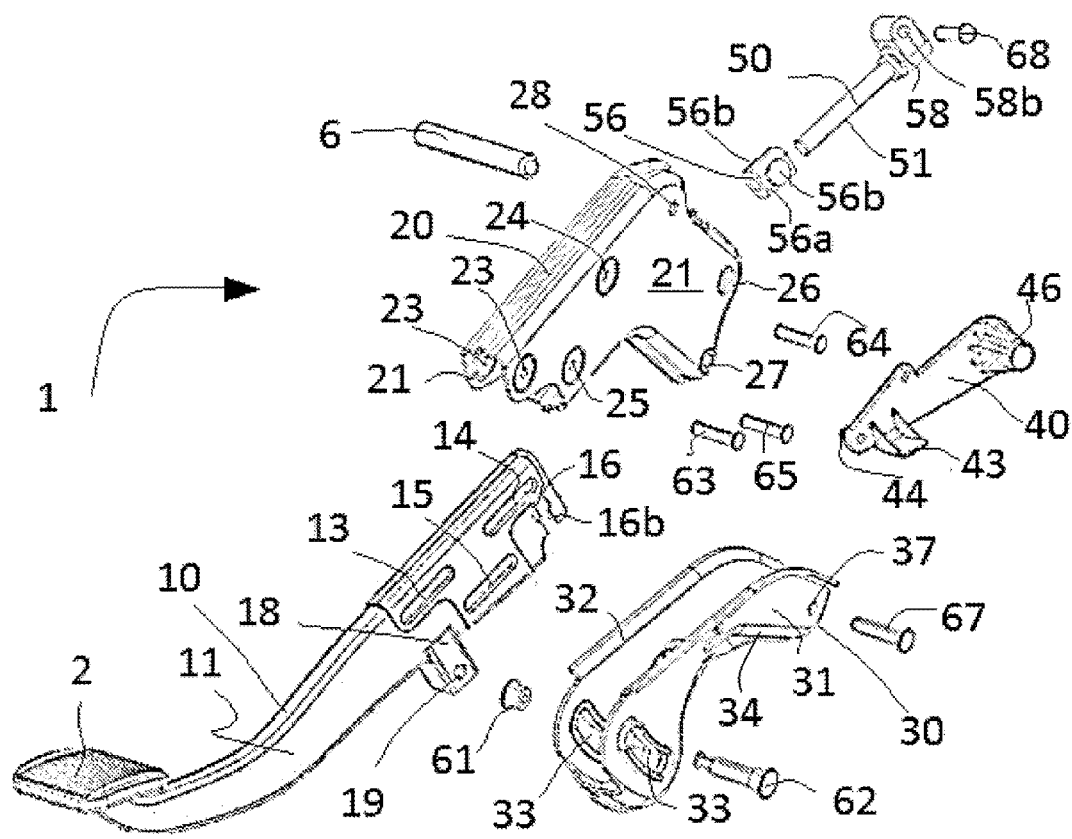
FIG. 4 is an exploded view of the adjustable brake pedal shown in FIG. 1.
Figure 5:
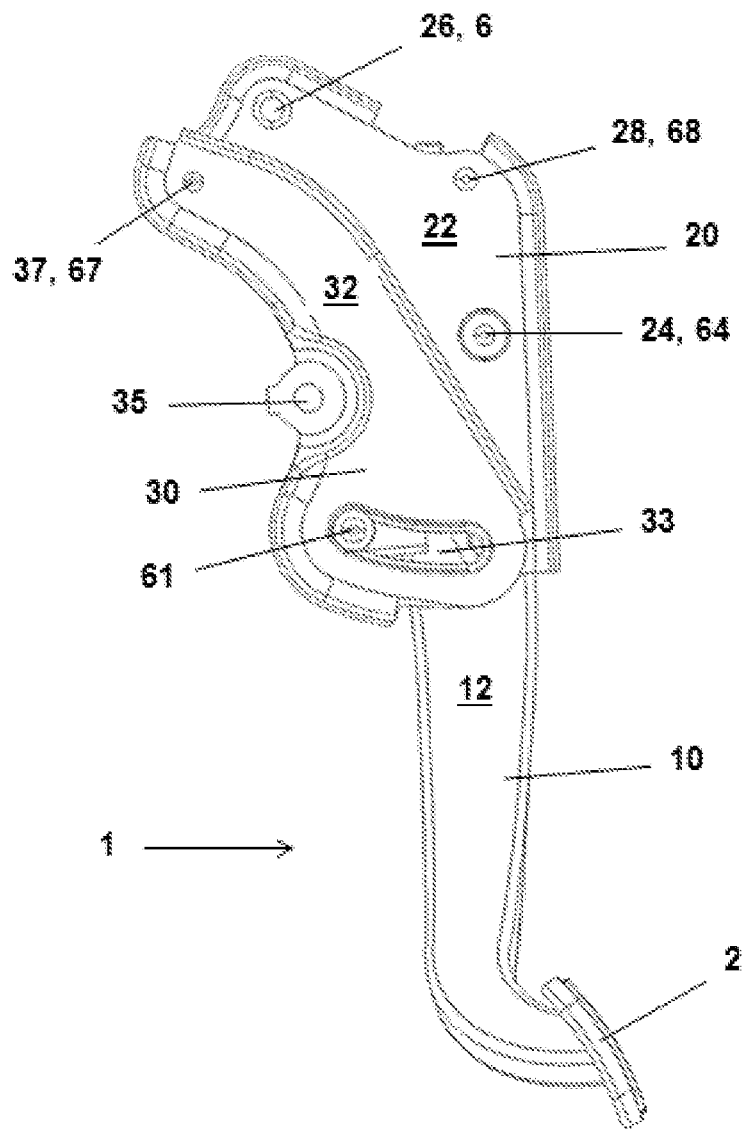
FIG. 5 shows a side view of the adjustable brake pedal shown in FIG. 1 in a position where the pedal is retracted.
Figure 6:
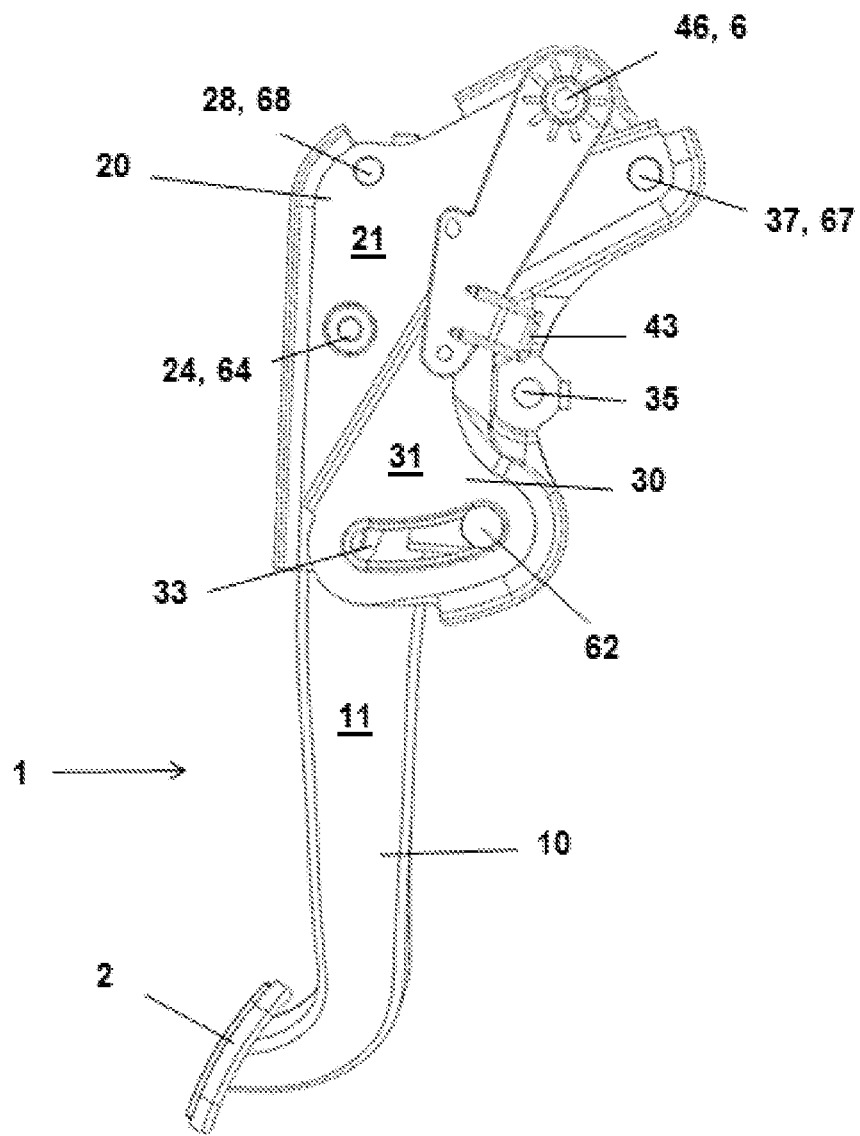
FIG. 6 shows another side view of the adjustable brake pedal shown in FIG. 1 in a position where the pedal is retracted.
Figure 7:
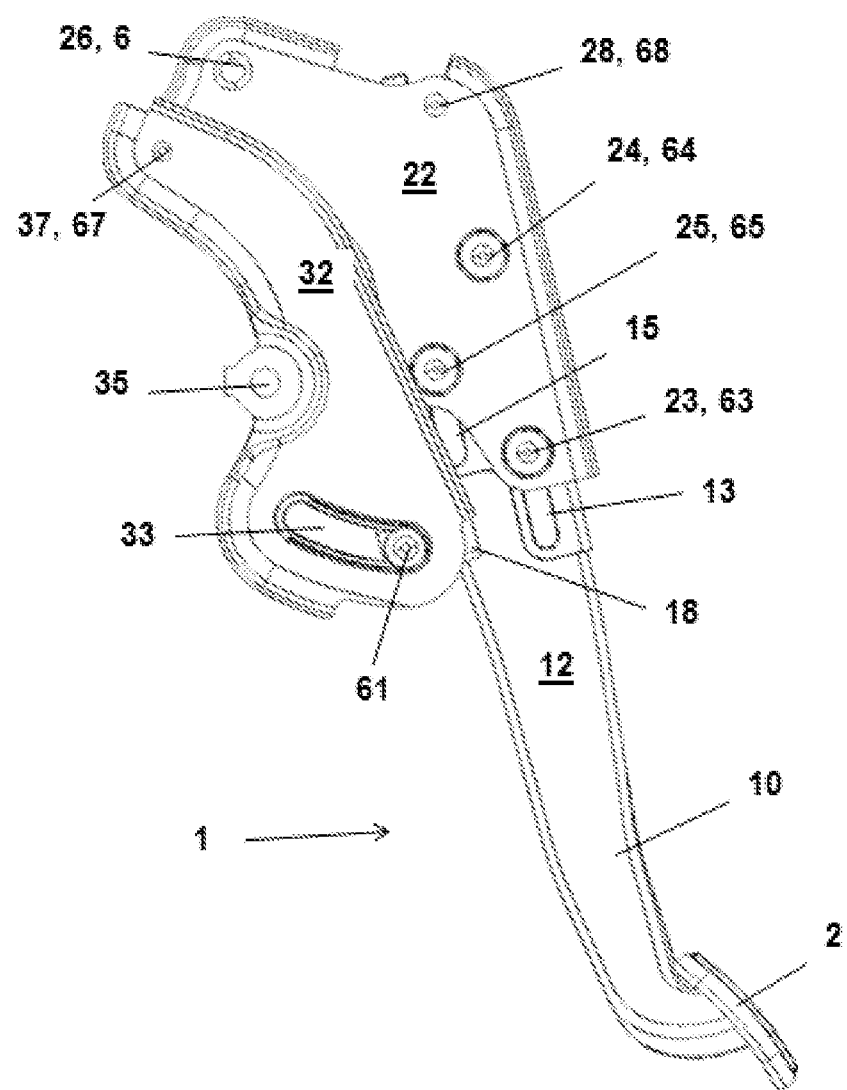
FIG. 7 shows a side view of the adjustable brake pedal shown in FIG. 1 in a position where the pedal is extended.
Figure 8:
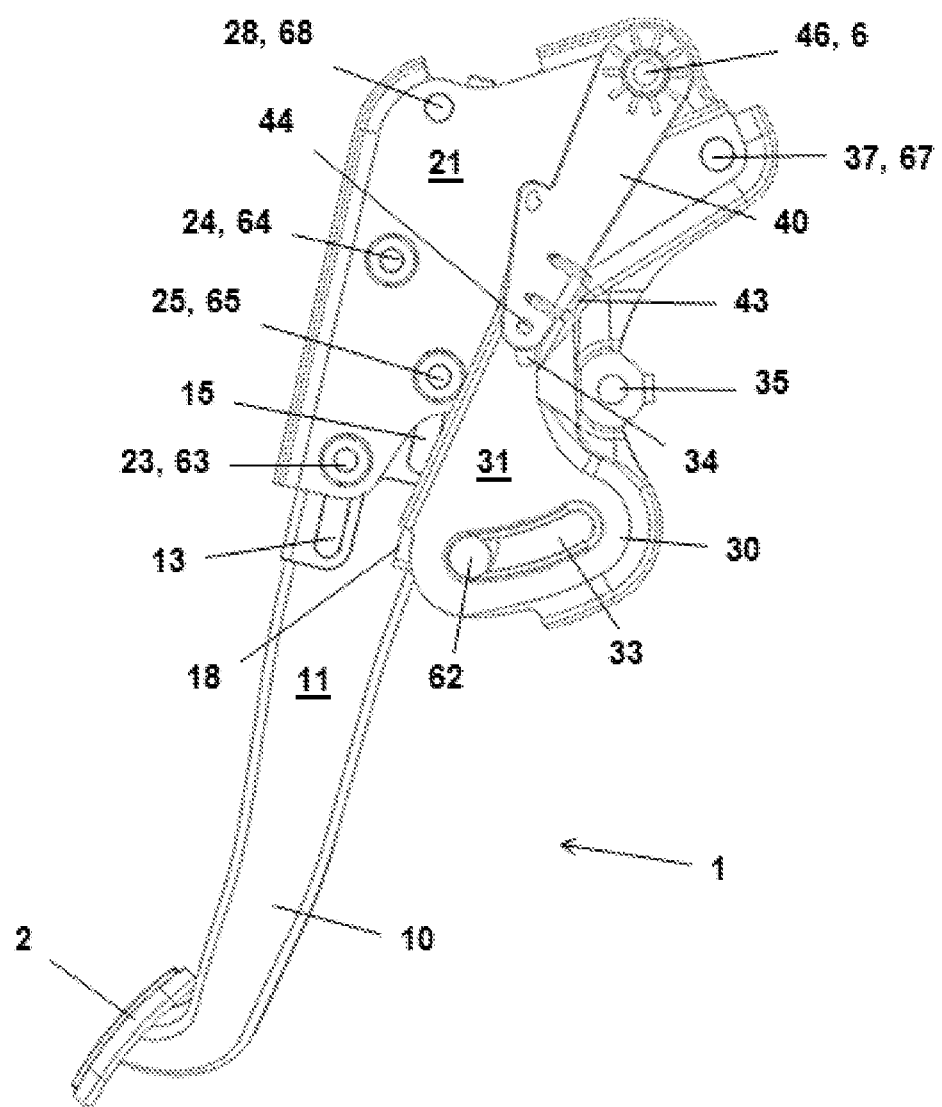
FIG. 8 shows another side view of the adjustable brake pedal shown in FIG. 1 in a position where the pedal is extended.

FIG. 1 shows a pedal assembly 60 according to one implementation that comprises an adjustable brake pedal 1 suitable for motor vehicles. Particularly FIGS. 1 to 8 show the adjustable brake pedal 1 having a first body 10 including at a lower end 10b a shoe 2, a second body 20 pivotable with respect to a rotating shaft 6, the first body 10 being coupled to the second body 20, and a third body 30 pivotably arranged with respect to the second body 20 and movably coupled with respect to the first body 10. The first body 10 includes a lower end section 10a and a substantially straight upper end section 10c that is coextensive to the lower end section. The pedal assembly 60 comprises a support 7 wherein the pedal 1 is arranged coupled through the rotating shaft 6.

The pedal 1 is suitable for the connection thereof to the rod (not depicted in the figures) of an actuator, preferably a servobrake. To that end, the third body 30 comprises a coupling 35 wherein said rod may be pivotably coupled.

The pedal 1 further comprises a control device 50 suitable for adjusting the position of the pedal 1 to the driver's needs, such that when the user steps on the shoe 2 he/she gets a sensation of homogeneity for all the adjustment positions of said pedal 1. The control device 50, shown in detail in FIG. 4, includes a support 58 which is pivotably coupled to the second body 20, a screw 51 which is coupled at one end to the support 58, rotatable with respect to the support 58, and a threaded nut 56 movable along the screw 51 and pivotably coupled to the first body 10. The screw 51 can rotate with respect to the support 58 through a cable not shown in the drawings.

The first body 10 and the second body 20 are arranged with respect to one another in a telescopic manner, the control device 50 being housed inside the first body and the second body 20. The control device 50 controls the distance between the rotating shaft 6 and the coupling 35, keeping the ratio of the distance between the rotating shaft 6 and the shoe 2 and the distance between the rotating shaft 6 and the coupling 35 of the third body 30 substantially constant.

According to some implementations each of the first body 10 and the second body 20 comprise a substantially rectangular-shaped cross-section. In the implementation shown in the drawings, both bodies 10 and 20 comprise a closed cross-section. Both bodies 10 and 20 are made of thin metal sheets, preferably having a thickness between about 1.0 mm and about 2.5 mm. In the implementation shown in the drawings, the first body 10 is partially housed inside the second body 20, both bodies 10 and 20 being substantially coaxial to one another, the first body 10 being moved with respect to the second body 20 in a telescopic manner.

According to some implementations the third body 30 comprises a substantially U-shaped cross-section, the first body 10 and the second body 20 being housed partially inside the third body 30. A more compact and lightweight pedal is thus obtained. With the geometry of the second body 20, its moment of inertia is successfully increased with a reduced weight, improving the mechanical performance of the pedal 1. Furthermore, the control device 50 is protected inside the bodies 10, 20 and 30.

The first body 10 comprises side walls 11 and 12 substantially parallel to one another and arranged facing one another, in each of which there is arranged at least one slot 13, 14 and 15 extending longitudinally to the first body 10, through which the first body 10 is movably coupled with respect to the second body 20. The second body 20 in turn comprises also side walls 21 and 22 substantially parallel to one another and arranged facing one another, comprising at least one hole 23, 24 and 25 in each side wall 21 and 22. The first body 10 is coupled to the second body 20 through a respective pivot 63, 64 and 65 which is inserted in the second body 20, traversing the slot 13, 14 and 15 and the corresponding hole 23, 24 and 25, such that the first body 10 can move with respect to the second body 20. In the implementation shown in the drawings, the first body 10 comprises three slots 13, 14 and 15 arranged substantially parallel to one another, cooperating with the respective pivots 63, 64 and 65 that are inserted in the respective holes 23, 24 and 25 in the second body 20, the guiding of the telescopic movement being improved. In the implementation shown, slots 13 and 14 are substantially aligned with one another, as shown in the drawings.

The second body 20 is at least partially housed in the support 7 of the pedal assembly 60, fixed to side walls 7b of the support 7 through the rotating shaft 6 which traverses the side walls 21 and 22 of the second body 20 through respective holes 26.

The control device 50 is pivotably coupled to an end of the second body 20 through a pivot 68 traversing the support 58 of the control device 50 and a hole 28 arranged in each side wall 21 and 22 of the second body 20. The control device 50 is also coupled to the first body 10 through the nut 56 which is coupled in a hole 16 arranged in each side wall 11 and 12 of the first body 10. According to some implementations the nut 56 comprises a projection 56b extending in a substantially orthogonal manner from each of the two surfaces 56a of the nut 56 that are substantially planar and arranged substantially parallel to one another. Both projections 56b are substantially aligned with one another and are inserted in the corresponding hole 16 of the first body 10, said hole being open to allow coupling the nut 56 to the first body 10. In the implementation shown, the screw 51 is longitudinally aligned with the first body 10 and the second body 20. The nut 56 is arranged on two supports in the body 10, particularly in both side walls 11 and 12 of the first body 10, stress distribution between both supports being improved.

The third body 30 is pivotably coupled at one end to the second body 20 through a pivot 67 traversing the third body 30 and the second body 20 through the corresponding holes 37 and 27. The third body 30 is movably coupled at the opposite end to the first body 10. To that end, the first body 10 comprises an extension 18 which is housed inside the third body 30, and the third body 30 comprises a slot 33 in each side wall 31 and 32, both slots 33 arranged aligned with one another, a pin 61 and 62 being housed in the slot 33 traversing the slots 33 and the extension 18 through a corresponding hole 19, such that it allows the rotation of the third body 30 with respect to the second body 20 when the first body 10 is moved with respect to the second body 20 by means of the control device 50. The slot 33 of the third body 30 is a curvilinear slot.

When the driver needs to adapt the position of the pedal 1, particularly of the shoe 2, to his/her physical characteristics, he/she transmits a rotational movement to the screw 51 through an electrically-operated or manually-operated cable, or through a motor directly coupled to the screw, both cable and motor not being depicted in the drawings. The screw 51 can rotate with respect to the support 58 of the control device 50, the screw 51 comprising means, which are known, to prevent sliding in both directions of rotation.

Once the driver operates the control device 50, the screw 51 causes the movement of the nut 56 and therefore of the first body 10 that moves telescopically with respect to the second body 20 by means of the slots 13, 14 and 15. In a parallel manner, the third body 30, forced by the corresponding pin assembly 61 and 62 which is fixed to the first body 10 and moved along the curvilinear slot 33 of the third body 30, rotates with respect to the second body 20 such that the ratio of the distance between the rotating shaft 6 and the shoe 2 and the rotating shaft 6 and the coupling 35 is kept substantially constant in any position of the pedal 1 during control thereof between the retracted position shown in the FIGS. 5 and 6 and the extended position shown in FIGS. 7 and 8.

The adjustment pedal 1 may further comprise a cam 40 pivotably coupled at one end to the rotating shaft 6 through a corresponding hole 46 and movably coupled to the third body 30. The cam 40 comprises a contact surface 43 suitable for contacting a switch or a spring fixed in the pedal assembly, to that end it being necessary for the contact surface 43 to keep an absolute position constant with respect to the rotating shaft 6. To that end, the third body 30 comprises a slot 34 arranged in one of the side walls 31 of the third body 30, along which a projection 44 of the cam 40 moves.

The cam 40 is arranged outside the third body 30 coupled to one of the side walls 31 of said third body 30. The projection 44 extends in a substantially orthogonal manner with respect to the cam 40. The slot 34 is a curvilinear slot (although it can be substantially straight in other implementations) the geometry of which is calculated so that the contact surface 43 maintains its absolute position.

What is claimed is:

1. An adjustable pedal for motor vehicles comprising:
a first body including a lower end section having a shoe, the first body further including an upper end section coextensive to the lower end section,
a second body coupled to a rotating shaft, the second body having a top end and a first section opposite the top end, the first section being telescopically coupled to the upper end section of the first body so that the first body is movable within the second body to alter a distance between the top end of the second body and the shoe of the first body,
a control device configured to adjust a position of the pedal, the control device comprising a rotatable screw having external threads and a threaded nut having a threaded internal through hole that cooperates with the external threads of the rotatable screw, the threaded nut being movable along the rotatable screw when the rotatable screw rotates, the rotatable screw being supported at a first end by a support element that is attached to the second body, the threaded nut being coupled directly to the upper end section of the first body in a manner that allows the rotatable screw to rotate with respect to the first body,
a third body that rotates with respect to the second body and is movably coupled with respect to the first body, the third body being coupled to an actuator through a coupling, and
wherein upon there being a rotation of the rotatable screw the first, second and third bodies are configured to be moved relative to one another to keep a ratio of a distance between the rotating shaft and the shoe and a distance between the rotating shaft and the coupling substantially constant;
the adjustable pedal further comprising a cam attached to the rotating shaft so that the cam pivots with respect to the second body, the cam being movably coupled to the third body, the cam comprising a contact surface that is positioned in an absolute position that is constant with respect to the rotating shaft upon there being the rotation of the rotatable screw, the cam being externally coupled to the third body, the third body comprising a first slot having a length and being enclosed in at least one of first and second sidewalls of the third body, the cam having a projection that is located within the first slot of the third body and movable along the length of the slot of the third body for maintaining the absolute position of the contact surface upon there being the rotation of the rotatable screw.

2. The adjustable pedal according to claim 1, wherein the first section of the second body is telescopically coupled to the upper end section of the first body by a coupling that comprises:
a first slot arranged in the upper end section of the first body, the first slot of the first body being substantially straight and extending longitudinally to the upper end section of the first body;
a first hole arranged enclosed in the first section of the second body;
a first pivot residing in the first hole of the second body and extending through the first slot of the first body, the first slot of the first body having a length that allows the first pivot to move within the first slot of the first body along the length of the first slot of the first body;
a second slot arranged enclosed in the upper end section of the first body, the second slot of the first body extending substantially parallel to the first slot of the first body and being longitudinally spaced apart from the first slot of the first body, each of the first and second slots of the first body being arranged in a wall of the first body, the wall of the first body having a first side and a second side opposite the first side, each of the first and second slots of the first body extending completely between and through the first and second sides of the wall of the first body;
a second hole arranged in the first section of the second body;
a second pivot coupling the first body to the second body, the second pivot residing in the second hole of the second body and extending through the second slot of the first body, the second slot of the first body having a length that allows the second pivot to move within the second slot of the first body along the length of the second slot of the first body so that when the second pivot moves in the second slot the first body telescopically moves with respect to the second body.

3. The adjustable pedal according to claim 2, wherein the first body is coupled directly to the second body.

4. The adjustable pedal according to claim 1, wherein the first body has a first sidewall and a second sidewall that are spaced-apart from one another, each of the first and second sidewalls of the first body having an inner surface and an outer surface with the inner surface of the first sidewall of the first body arranged facing the inner surface of the second sidewall of the first body, the first sidewall of the first body including a first hole that extends through the first sidewall of the first body, the second sidewall of the first body including a second hole that extends through the second sidewall of the first body, the threaded nut of the control device comprising a first projection supported in the first hole and a second projection supported in the second hole.

5. The adjustable pedal according to claim 4, wherein the threaded nut comprises a first side surface and a second side surface opposite the first side surface, the first projection extending in a first direction in a substantially orthogonal manner from the first side surface of the threaded nut, the second projection extending in a second direction opposite the first direction in a substantially orthogonal manner from the second side surface of the threaded nut.

6. The adjustable pedal according to claim 1, wherein the second body has a first sidewall and a second sidewall that are spaced-apart from one another, each of the first and second sidewalls of the second body having an inner surface and an outer surface with the inner surface of the first sidewall of the second body arranged facing the inner surface of the second sidewall of the second body, the rotatable screw residing at least partially inside the second body between the inner surface of the first sidewall of the second body and the inner surface of the second sidewall of the second body, the first and second sidewalls of the third body are spaced-apart from one another, each of the first and second sidewalls of the third body having an inner surface and an outer surface with the inner surface of the first sidewall of the third body arranged facing the inner surface of the second sidewall of the third body, at least a portion of each of the threaded nut, first body, second body and rotatable screw being housed inside the third body between the inner surface of the first sidewall of the third body and the inner surface of the second-sidewall of the third body.

7. The adjustable pedal according to claim 6, wherein the upper end section of the first body is substantially straight, the first body comprising an extension that extends orthogonally from a bottom of the upper end section of the first body, the extension being at least partially housed between the first and second sidewalls of the third body, and the third body comprises a second slot enclosed within at least one of the first and second sidewalls of the third body, a pin being housed in the second slot of the third body traversing the second slot in the third body and a hole in the extension permitting the rotation of the third body with respect to the second body when the first body is moved with respect to the second body by the control device.

8. The adjustable pedal according to claim 6, wherein the first body has a first sidewall and a second sidewall that are spaced-apart from one another, each of the first and second sidewalls of the first body having an inner surface and an outer surface with the inner surface of the first sidewall of the first body arranged facing the inner surface of the second sidewall of the first body, the first sidewall and the second sidewall of the first body being located between the inner surface of the first sidewall of the second body and the inner surface of the second sidewall of the second body, each of the first and second sidewalls of the first body respectively comprising first and second slots, each of the first and second sidewalls of the second body respectively comprising first and second through holes, wherein a pivot resides in and traverses each of the first and second slots of the first body and the first and second holes of the second body.

9. The adjustable pedal according to claim 6, wherein the first body comprises an extension that extends orthogonally from a bottom of the upper end section of the first body, the extension being at least partially housed inside the third body between the first and second sidewalls of the third body, the third body comprising a second slot enclosed in the first sidewall of the third body and a third slot enclosed in the second sidewall of the third body, the second and third slots of the third body arranged aligned parallel with one another, a pin traverses the second and third slots of the third body and a hole in the extension permitting the rotation of the third body with respect to the second body when the first body is moved with respect to the second body by the control device.

10. The adjustable pedal according to claim 9, wherein each of the first and second bodies comprises a substantially rectangular-shaped cross-section, at least a portion of each of the first body and the second body being housed inside the third body between the inner surface of the first sidewall of the third body and the inner surface of the second sidewall of the third body.

11. The adjustable pedal according to claim 6, wherein the first section of the second body is substantially straight and the rotatable screw has a longitudinal axis that is arranged and remains substantially parallel to the substantially straight first section of the second body during an adjustment of the pedal.

12. The adjustable pedal according to claim 6, wherein the first body comprises an extension that extends orthogonally from a bottom of the first body, the extension being at least partially housed inside the third body between the first and second sidewalls of the third body, the third body comprising a second slot enclosed in the first sidewall of the third body and a third slot enclosed in the second sidewall of the third body, the second and third slots of the third body arranged aligned parallel with one another, a pin traverses the second and third slots of the third body and a hole in the extension permitting the rotation of the third body with respect to the second body when the first body is moved with respect to the second body by the control device.

13. The adjustable pedal according to claim 12, wherein each of the first and second bodies comprises a substantially rectangular-shaped cross-section, at least a portion of each of the first body and the second body being housed inside the third body between the inner surface of the first sidewall of the third body and the inner surface of the second sidewall of the third body.

14. An adjustable pedal for motor vehicles comprising:
a first body including a lower end section having a shoe, the first body further including an upper end section coextensive to the lower end section,
a second body coupled to a rotating shaft, the second body having a top end and a first section opposite the top end, the first section being telescopically coupled to the upper end section of the first body so that the first body is movable within the second body to alter a distance between the top end of the second body and the shoe of the first body,
a control device configured to adjust a position of the pedal, the control device comprising a rotatable screw having external threads and a threaded nut having a threaded internal through hole that cooperates with the external threads of the rotatable screw, the threaded nut being movable along the rotatable screw when the rotatable screw rotates, the rotatable screw being supported at a first end by a support element that is attached to the second body, the threaded nut being coupled to the upper end section of the first body, the second body having a first sidewall and a second sidewall that are spaced-apart from one another, each of the first and second sidewalls of the second body having an inner surface and an outer surface with the inner surface of the first sidewall of the second body arranged facing the inner surface of the second sidewall of the second body, the rotatable screw residing at least partially inside the second body between the inner surface of the first sidewall of the second body and the inner surface of the second sidewall of the second body;
a third body that pivots with respect to the second body and that is movably coupled with respect to the first body, the third body being coupled to an actuator through a coupling, the third body having a first sidewall and a second sidewall that are spaced-apart from one another, each of the first and second sidewalls of the third body having an inner surface and an outer surface with the inner surface of the first sidewall of the third body arranged facing the inner surface of the second sidewall of the third body, at least a portion of each of the threaded nut, first body, second body and rotatable screw being housed inside the third body between the inner surface of the first sidewall of the third body and the inner surface of the second-sidewall of the third body, and
wherein upon there being a rotation of the rotatable screw the first, second and third bodies are configured to be moved relative to one another to keep a ratio of a distance between the rotating shaft and the shoe and a distance between the rotating shaft and the coupling substantially constant;

the adjustable pedal further comprising a cam attached to the rotating shaft so that the cam pivots with respect to the second body, the cam being movably coupled to the third body, the cam comprising a contact surface that is positioned in an absolute position that is constant with respect to the rotating shaft upon there being the rotation of the rotatable screw;

wherein the cam is externally coupled to the third body, the third body comprising a first slot having a length and enclosed in at least one of the first and second sidewalls of the third body, the cam having a projection that is located within the first slot of the third body and movable along the length of the first slot of the third body for maintaining the absolute position of the contact surface upon there being the rotation of the rotatable screw.

15. The adjustable pedal according to claim 14, wherein the first section of the second body is substantially straight and the rotatable screw has a longitudinal axis that is arranged substantially parallel to the substantially straight first section of the second body during an adjustment of the pedal.

16. The adjustable pedal according to claim 14, wherein the threaded nut is coupled directly to the upper end section of the first body.

17. The adjustable pedal according to claim 14, wherein the first body is coupled directly to the second body.

18. The adjustable pedal according to claim 17, wherein the first section of the second body is substantially straight and the rotatable screw has a longitudinal axis that is arranged substantially parallel to the substantially straight first section of the second body during an adjustment of the pedal.

19. The adjustable pedal according to claim 14, wherein the upper end section of the first body is substantially straight, the first body comprising an extension that extends orthogonally from a bottom of the first body, the extension being at least partially housed between the first and second sidewalls of the third body, and the third body comprises a second slot enclosed within at least one of the first and second sidewalls of the third body, a pin being housed in the second slot of the third body traversing the second slot of the third body and a hole in the extension permitting the rotation of the third body with respect to the second body when the first body is moved with respect to the second body by the control device.

20. The adjustable pedal according to claim 14, wherein the first body has a first sidewall and a second sidewall that are spaced-apart from one another, each of the first and second sidewalls of the first body having an inner surface and an outer surface with the inner surface of the first sidewall of the first body arranged facing the inner surface of the second sidewall of the first body, the first sidewall and the second sidewall of the first body being located between the inner surface of the first sidewall of the second body and the inner surface of the second sidewall of the second body.

21. The adjustable pedal according to claim 14, wherein the first body has a first sidewall and a second sidewall that are spaced-apart from one another, each of the first and second sidewalls of the first body having an inner surface and an outer surface with the inner surface of the first sidewall of the first body arranged facing the inner surface of the second sidewall of the first body, the first sidewall of the first body including a first hole enclosed in the first sidewall of the first body, the second sidewall of the first body including a second hole enclosed in the second sidewall of the first body, the threaded nut of the control device comprising a first projection supported in the first hole and a second projection supported in the second hole.

22. The adjustable pedal according to claim 21, wherein the threaded nut comprises a first side surface and a second side surface opposite the first side surface, the first projection extending in a first direction in a substantially orthogonal manner from the first side surface of the threaded nut, the second projection extending in a second direction opposite the first direction in a substantially orthogonal manner from the second side surface of the threaded nut.

23. The adjustable pedal according to claim 14, wherein the first section of the second body is telescopically coupled to the upper end section of the first body by a coupling that comprises:
a first slot arranged in the upper end section of the first body, the first slot of the first body being substantially straight and extending longitudinally to the upper end section of the first body;
a first hole arranged enclosed in the first section of the second body;
a first pivot residing in the first hole of the second body and extending through the first slot of the first body, the first slot of the first body having a length that allows the first pivot to move within the first slot of the first body along the length of the first slot of the first body;
a second slot arranged enclosed in the upper end section of the first body, the second slot of the first body extending substantially parallel to the first slot of the first body and being longitudinally spaced apart from the first slot of the first body, each of the first and second slots of the first body being arranged in a wall of the first body, the wall of the first body having a first side and a second side opposite the first side, each of the first and second slots of the first body extending completely between and through the first and second sides of the wall of the first body;
a second hole arranged in the first section of the second body;
a second pivot coupling the first body to the second body, the second pivot residing in the second hole of the second body and extending through the second slot of the first body, the second slot of the first body having a length that allows the second pivot to move within the second slot of the first body along the length of the second slot of the first body so that when the second pivot moves in the second slot the first body telescopically moves with respect to the second body.

* * * * *